United States Patent
Hicks

(10) Patent No.: US 7,100,154 B2
(45) Date of Patent: Aug. 29, 2006

(54) DYNAMIC COMPILER APPARATUS AND METHOD THAT STORES AND USES PERSISTENT EXECUTION STATISTICS

(75) Inventor: Daniel Rodman Hicks, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 10/345,916

(22) Filed: Jan. 16, 2003

(65) Prior Publication Data

US 2004/0143825 A1    Jul. 22, 2004

(51) Int. Cl.
*G06F 9/45*    (2006.01)
*G06F 9/44*    (2006.01)

(52) U.S. Cl. .................. 717/148; 717/140; 717/145

(58) Field of Classification Search ............ 717/131, 717/136, 140–143, 145–149, 151–153, 158
See application file for complete search history.

(56) References Cited

U.S. PATENT DOCUMENTS

| | | | | |
|---|---|---|---|---|
| 5,452,457 A * | 9/1995 | Alpert et al. | ............... | 717/153 |
| 5,530,964 A * | 6/1996 | Alpert et al. | ............... | 717/158 |
| 6,090,155 A * | 7/2000 | Donovan et al. | ........... | 717/158 |
| 6,233,679 B1 * | 5/2001 | Holmberg | ................... | 712/240 |
| 6,463,582 B1 * | 10/2002 | Lethin et al. | ............... | 717/158 |
| 6,467,082 B1 * | 10/2002 | D'Arcy et al. | .............. | 717/127 |
| 6,728,955 B1 * | 4/2004 | Berry et al. | ................ | 717/158 |
| 6,732,357 B1 * | 5/2004 | Berry et al. | ................ | 717/158 |
| 6,742,179 B1 * | 5/2004 | Megiddo et al. | ............ | 717/130 |
| 6,760,907 B1 * | 7/2004 | Shaylor | ....................... | 717/158 |
| 6,851,109 B1 * | 2/2005 | Alexander et al. | .......... | 717/148 |
| 6,865,734 B1 * | 3/2005 | Holzle et al. | ............... | 717/153 |
| 6,880,152 B1 * | 4/2005 | Torvalds et al. | ............ | 717/138 |
| 6,996,814 B1 * | 2/2006 | Bak | ........................... | 717/148 |

OTHER PUBLICATIONS

Ebcioglu et al, "Dyanmic binary translation and optimization" IEEE Tran. on computers vol. 50, No. 6, pp. 529-548, 2001.*
Unnikrishanan et al, "Reducing dynamic compilation overhead by overlapping compilation and execution", IEEE, pp. 929-934, 2006.*
Mock et al, "Improving program slicing with dynamic points to data", ACM SIGSOFT, pp. 71-80, 2002.*
Lysecky et al, "Dyanmic FPGA routing for just in time FPGA compilation", ACM DAC, pp. 954-959, 2004.*
Radhakrishnan, "Java Virtual Machine", CiteSeer, University of Kansas, Dept. of Electrical Engineering and Computer Science, pp. 1-37, Dec. 1997.

* cited by examiner

*Primary Examiner*—Anil Khatri
(74) *Attorney, Agent, or Firm*—Martin & Associates, LLC; Derek P. Martin

(57) ABSTRACT

Dynamic compilation logic collects execution statistics into a persistent store as a computer program is executed so the execution statistics may be used by the dynamic compilation logic in subsequent executions of the computer program. By saving execution statistics in a persistent store, the dynamic compilation logic can use the execution statistics from previous executions to know which portions of the computer program to immediately compile when the execution of the computer program begins, and how to best compile and optimize certain portions of the computer program. In the preferred embodiments, the persistent store is an attachment to an object oriented class file.

39 Claims, 4 Drawing Sheets

DYNAMIC COMPILER APPARATUS AND METHOD THAT STORES AND USES PERSISTENT EXECUTION STATISTICS

RELATED APPLICATIONS

This patent application is related to the following pending U.S. patent applications: "COMPUTER SYSTEM, PROGRAM PRODUCT AND METHOD UTILIZING EXECUTABLE FILE WITH ALTERNATE PROGRAM CODE ATTACHED AS A FILE ATTRIBUTE", Ser. No. 09/024,111, filed by Hicks on Feb. 17, 1998; and "APPARATUS AND METHOD FOR CACHING ANALYZED PROGRAM INFORMATION", Ser. No. 10/193,581, filed by Blais et al. on Jul. 11, 2002. Both of these related applications are incorporated herein by reference.

BACKGROUND OF THE INVENTION

1. Technical Field

This invention generally relates to computer systems, and more specifically relates to apparatus and methods for processing computer programs.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run a Microsoft Windows operating system, and under the control of the operating system, a user may execute an application program, such as a word processor. Windows is a registered trademark of Microsoft Corporation. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved. The Java programming language developed by Sun Microsystems is one modern object oriented programming language that has become very popular in recent years.

Recent developments in Java include just-in-time (JIT) compilers. A JIT compiler is one specific example of a dynamic compiler that compiles portions of a computer program as the computer program is executing under control of a Java Virtual Machine (JVM) that includes dynamic compilation logic. Most JVMs can execute a program in different modes, namely interpreted mode and compiled mode, and typically begin program execution before the entire program is loaded. In interpreted mode, each Java virtual machine instruction is individually emulated using a pre-written subroutine of native machine instructions. Interpreting Java instructions does not require compilation, but is typically much slower than executing the same Java instruction that has been compiled. In compiled mode, the Java instructions are compiled into machine code. Compiling on-the-fly requires overhead. However, once the compilation has been done, the compiled code can then be executed very quickly. Thus, a JVM typically begins loading and running a program in interpreted mode, and will us a dynamic compiler to dynamically compile portions of the code that are frequently executed to improve performance.

Dynamic compilation logic typically resides within a dynamic compiler and determines what is compiled, when it is compiled, and how it is compiled. One significant problem with known dynamic compilers is that they have no information about what portions of a computer program to compile until the computer program has been executed enough to generate execution statistics that can govern which portions are dynamically compiled, when they are compiled, and how they are compiled and optimized. Some dynamic compilers simply compile a method the first time it is invoked. This approach, however, is inefficient because it results in spending considerable time compiling methods that may be rarely invoked. A second approach is to compile execution statistics that show which portions of a computer program are executed often, and dynamically compiling portions of the computer program as their execution frequencies exceed some predefined threshold value. For example, the threshold value can be set to the number ten, which means the dynamic compiler will dynamically compile a program portion once the program portion has been executed ten times. With this second approach, the computer program must be run for a long enough period of time to collect execution statistics as it runs before dynamic compilation can occur.

Thus, this type of dynamic compiler must wait for execution statistics for the current execution in order to know what portions to dynamically compile, when to dynamically compile them, and how to compile and optimize them. This is true even if the computer program has been executed thousands or millions of times in the past.

Without a way for a dynamic compiler to use knowledge of past executions of a computer program in performing dynamic compilations, the computer industry will continue to suffer inefficient methods for dynamic compilation that are limited to the current execution of a computer program.

DISCLOSURE OF INVENTION

According to the preferred embodiments, dynamic compilation logic collects execution statistics into a persistent store as a computer program is executed so the execution statistics may be used by the dynamic compilation logic in subsequent executions of the computer program. By saving execution statistics in a persistent store, the dynamic compilation logic can use the execution statistics from previous executions to know which portions of the computer program to immediately compile when the execution of the computer program begins, and how to best compile and optimize certain portions of the computer program. In the preferred embodiments, the persistent store is an attachment to an object oriented class file.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
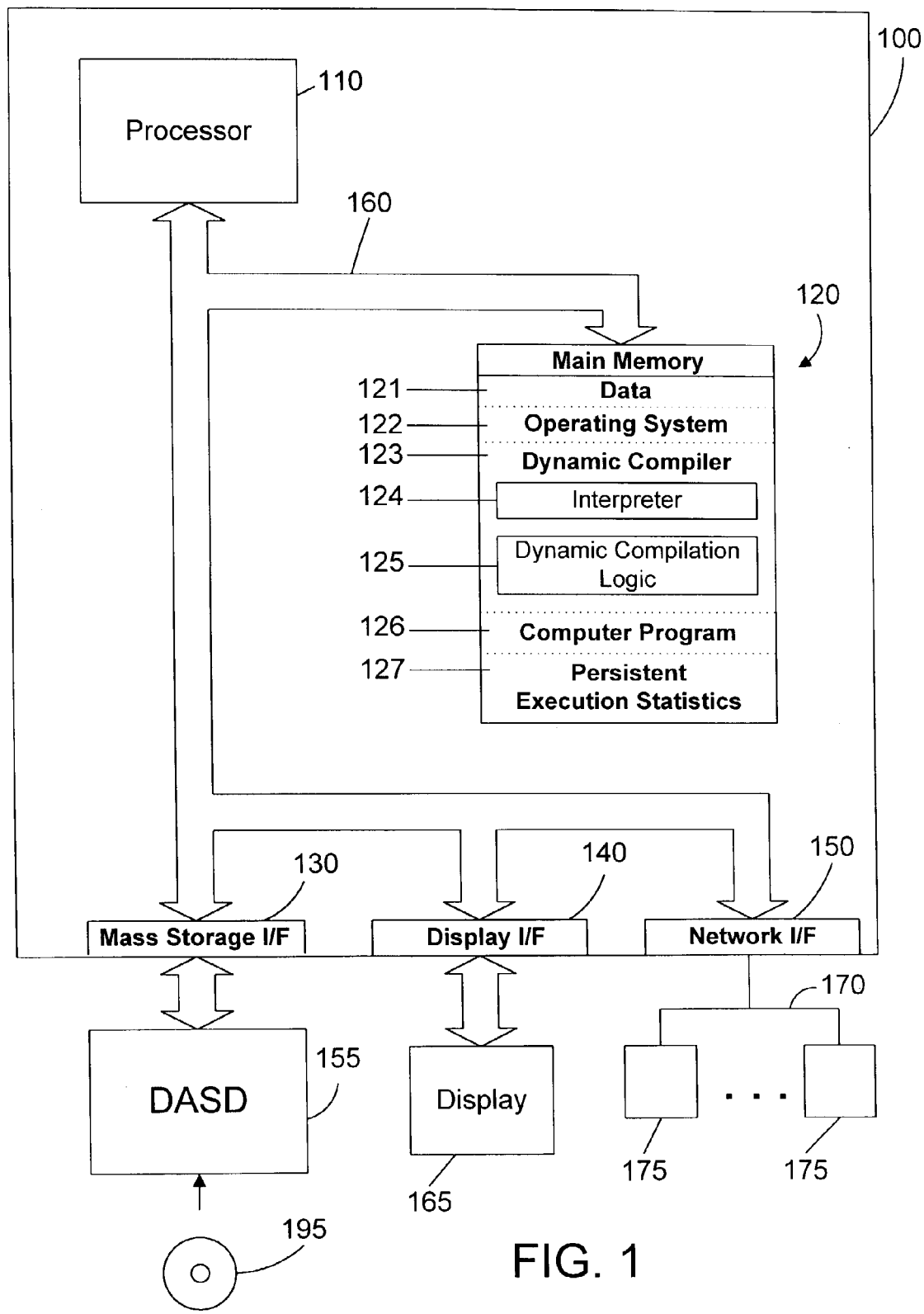
FIG. 1 is a block diagram of an apparatus in accordance with the preferred embodiments.

The present invention relates to object oriented programming techniques. For those individuals who are not generally familiar with object oriented programming, the Overview section below presents many of the concepts that will help to understand the invention.

1. Overview

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of entities called objects. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requester of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

A central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that presently support object oriented programming techniques. For example, Smalltalk, Object Pascal, C++ and Java are all examples of programming languages that support object oriented programming to one degree or another.

Known Dynamic Compilers

Figure 2:
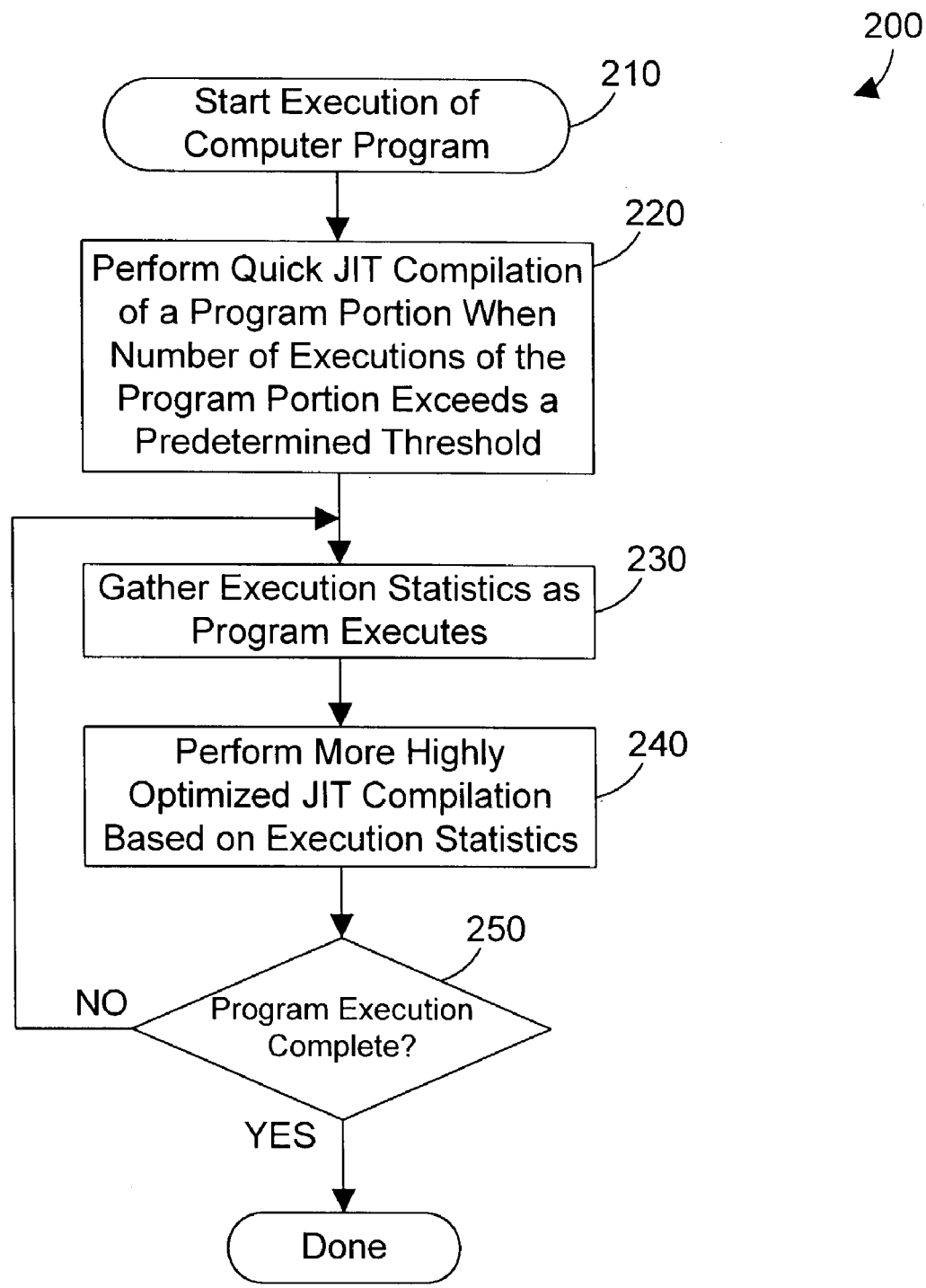
FIG. 2 is a flow diagram of a prior art method for executing a computer program.

Java is a computer programming language that may be executed in interpreted mode, in compiled mode, or using a mixture of the two modes. A prior art method 200 in FIG. 2 begins when a dynamic compiler starts execution of a computer program (step 210). The execution of the computer program may begin in either interpreted mode or in dynamically compiled mode. The dynamic compiler performs a quick dynamic compilation of a program portion when the number of executions of that program portion exceeds some predetermined threshold (step 220). For example, the dynamic compiler may have a predetermined threshold of ten, and will dynamically compile any program portion that has been executed ten or more times. Note that the dynamic compilation in step 220 is typically a quick compilation without much optimization. The execution of the computer program continues, and execution statistics are gathered during the execution (step 230). Using these execution statistics, more highly optimized dynamic compilation may be performed (step 240). If the program execution is complete (step 250=YES), method 200 is done. If not (step 250=NO), method loops back to step 230 and continues.

One significant drawback of prior art method 200 is dynamic compilation is based on execution statistics only for the current execution of the computer program. Thus, knowledge gleaned from previous executions of the computer program cannot be used in determining what program portions to dynamically compile, when to compile them, and how to compile and optimize them. Method 200 must start from scratch each time the computer program is executed to gather execution statistics, and to dynamically compile portions of the computer program based only on the execution statistics of the current execution.

2.0 Detailed Description

The preferred embodiments improve the efficiency of a dynamic compiler by storing the execution statistics for a computer program in a persistent store so that a dynamic compiler may use these executions statistics during subsequent executions of the computer program to decide which program portions should be dynamically compiled, when they should be dynamically compiled, and how they should be dynamically compiled and optimized. By storing execution statistics in a persistent store, the dynamic compiler immediately has information regarding previous executions of the computer program without having to wait for the collection of execution statistics for the current execution to determine what to dynamically compile, when to dynamically compile, and how to dynamically compile and optimize. In the preferred embodiments, the execution statistics are stored as an attachment to an object oriented class file.

Referring to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 121, an operating system 122, a dynamic compiler 123, a computer program 126, and persistent execution statistics 127. Dynamic compiler 123 includes an interpreter 124 and dynamic compilation logic 125. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Dynamic compiler 123 uses dynamic compilation logic 125 to determine which portions of the computer program 126 to run in interpreted mode using interpreter 124, which portions to dynamically compile, and how to dynamically compile. Computer program 126 is any computer program that includes one or more portions that may be executed in interpreted mode using interpreter 124 and that additionally includes one or more portions that may be compiled using dynamic compiler 123 according to dynamic compilation logic 125. In the preferred embodiments, computer program 126 is written in the Java programming language, and the dynamic compiler 123 interprets Java using interpreter 124 and dynamically compiles Java according to the dynamic compilation logic 125. Note, however, that the preferred embodiments are not limited to the Java programming language, and expressly extend to any programming language that allows a computer program to be run in interpreted mode while dynamic compilation is performed on portions of the computer program as it runs. The term "computer program" as used herein and in the claims includes both a complete computer program or any suitable portion thereof. In addition, while interpreter 124 is shown being part of dynamic compiler 123 in FIG. 1, the preferred embodiments expressly extend to an interpreter 124 that is separate from dynamic compiler 123.

Persistent execution statistics 127 are execution statistics that are stored persistently so they survive across different executions of a computer program. Direct access storage device 155 is one example of a persistent store for the persistent execution statistics 127. We assume that persistent execution statistics 127 shown in main memory 120 are copies of the corresponding execution statistics in a persistent store such as DASD 155, and that any changes and additions to the persistent execution statistics 127 in main memory 120 will be written to the persistent store. Examples of execution statistics include an indication of which program portions were referenced, how often they were referenced, and in what order, by a given program portion in the current class.

One suitable example of persistent execution statistics 127 is a count of the number of times each method in a computer program is invoked. Another suitable example of persistent execution statistics 127 is a count of the number of times each path is taken at each branch in a computer program. These are merely examples of some forms of execution statistics that may be gathered and stored persistently by the dynamic compiler. The preferred embodiments expressly extend to any and all forms of executions statistics that may relate to a computer program, whether now known or developed in the future.

Let's assume that computer program 126 is being executed for the very first time. The dynamic compiler 123 generates execution statistics during this first execution that are stored in the persistent execution statistics 127. The second time the computer program 126 is executed, the dynamic compiler may use the persistent execution statistics 127 from the previous execution of the computer program to perform dynamic compilations of portions of the computer program 126 even before any execution statistics are available from the current execution. This is one significant advantage of the preferred embodiments. The dynamic compiler may base decisions of what to initially dynamically compile on the execution statistics of past executions of the computer program. This is a great benefit in many scenarios. For example, in a multiprocessor computer system, when a dynamic compiler first starts to run a computer program in interpreted mode, there may be one or more processors sitting idle with nothing to do. In the preferred embodiments, the dynamic compiler 123 can determine from the persistent execution statistics 127 which portions of the computer program 126 should be immediately compiled based on the execution statistics of previous executions of the computer program, and may dispatch a thread to an idle processor to perform dynamic compilation at a time that the processor is otherwise idle, thereby enhancing system performance.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, dynamic compiler 123, computer program 126, and persistent execution statistics 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 3:
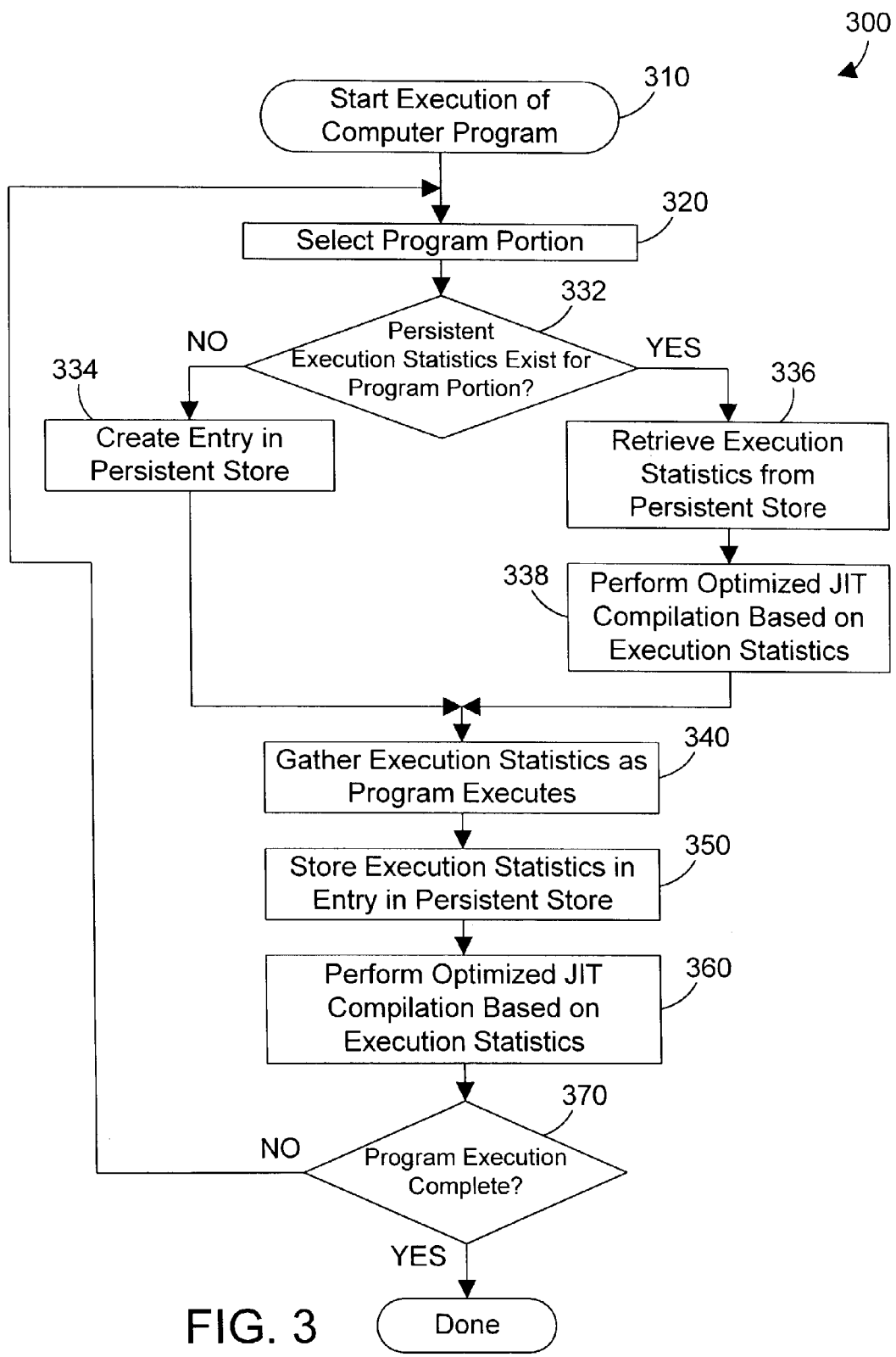
FIG. 3 is a flow diagram of a method in accordance with the preferred embodiments for executing a computer program.

Referring now to FIG. 3, a method 300 in accordance with the preferred embodiments is preferably performed by a dynamic compiler, such as dynamic compiler 123 in FIG. 1. Method 300 begins when a computer program needs to be executed (step 310). The execution of the computer program may begin in either interpreted mode or in dynamically compiled mode. A program portion is selected (step 320). Examples of suitable program portions are object oriented methods, groups of some methods (where some methods are called from other methods and "inlining" of the called methods into the text of the callers will provide additional optimization), and portions of a method (e.g., the body of a loop within a method that is otherwise interpreted). Method 300 then checks to see if persistent executions statistics exist for the selected program portion (step 332). If not (step 332=NO), an entry is created in the persistent store (step 334). Execution statistics are then gathered as the program executes (step 340), and these execution statistics are stored in the persistent store (step 350). Optimized dynamic compilation may then be performed based on the execution statistics (step 360). Note that the execution statistics in step 360 preferably include the execution statistics from the current execution as well as the execution statistics from previous executions. If program execution is complete (step 370=NO), method 300 is done. If program execution is not complete (step 370=NO), another program portion is selected in step 320, and method 300 continues.

If persistent execution statistics for the selected program portion exist (step 332=YES), these execution statistics are retrieved from the persistent store (step 336) and one or more portions of the computer program may be dynamically compiled based on the retrieved execution statistics (step 338), which are execution statistics gathered in one or more previous executions of the computer program. Steps 336 and 338 offer a considerable advantage over the prior art method 200 shown in FIG. 2. Because the execution statistics from previous executions of the computer program may be retrieved in step 336 and used in step 338 to dynamically compile portions of the computer program, method 300 need not wait until execution statistics for the current execution are collected before starting dynamic compilation of portions of the computer program. As a result, when persistent execution statistics exist for a portion of the computer program, the dynamic compiler may begin immediately to dynamically compile based on those persistent execution statistics from previous executions of the computer program. In addition, dynamic compilation may begin using a background process, thereby enhancing system performance by using unused processor capacity to dynamically compile certain program portions according to the persistent execution statistics. Since execution statistics can be collected during prior executions that indicate which program portions are used in what order, it is now possible with the preferred embodiments to anticipate the use of a given program portion and begin compilation of the program portion in a background process before it is needed.

Note that method 300 shown in FIG. 3 generally shows many of the steps performed by a dynamic compiler of the preferred embodiments, but the timing of steps in the preferred embodiments is difficult to show in a flow diagram, and is not as strict as shown in FIG. 3. For example, steps 340, 350 and 360 may be performed at the same time as steps 332, 334, 336 and 338. Method 300 in FIG. 3 lists steps that may be performed, but the sequence of performing those steps may vary within the scope of the preferred embodiments, including the performing of multiple steps at one time.

One of the related copending patent applications is "COMPUTER SYSTEM, PROGRAM PRODUCT AND METHOD UTILIZING EXECUTABLE FILE WITH ALTERNATIVE PROGRAM CODE ATTACHED AS A FILE ATTRIBUTE", Ser. No. 09/024,111 filed on Feb. 17, 1998 by Hicks. This related application discloses a way to associate alternate program code with an executable file by attaching the alternate program code as a file attribute to the executable file. Using the invention in the related application, Java code in an object oriented class file may be compiled, and the compiled code may then be stored as an attachment to the class file. The next time the class is invoked, the compiled code in the attachment may be executed instead of having to interpret or re-compile the Java code in the class file.

One suitable persistent store within the scope of the preferred embodiments is the attachment to a file as disclosed in the related application discussed above. In this manner, execution statistics may be attached to a class file for all program portions that are defined in the class file. For example, when a dynamic compiler executes a method in the class file, it updates the execution statistics in the class file attachment. In this manner a persistent class file carries with it the execution statistics that have been compiled from previous executions of the class file.

Figure 4:
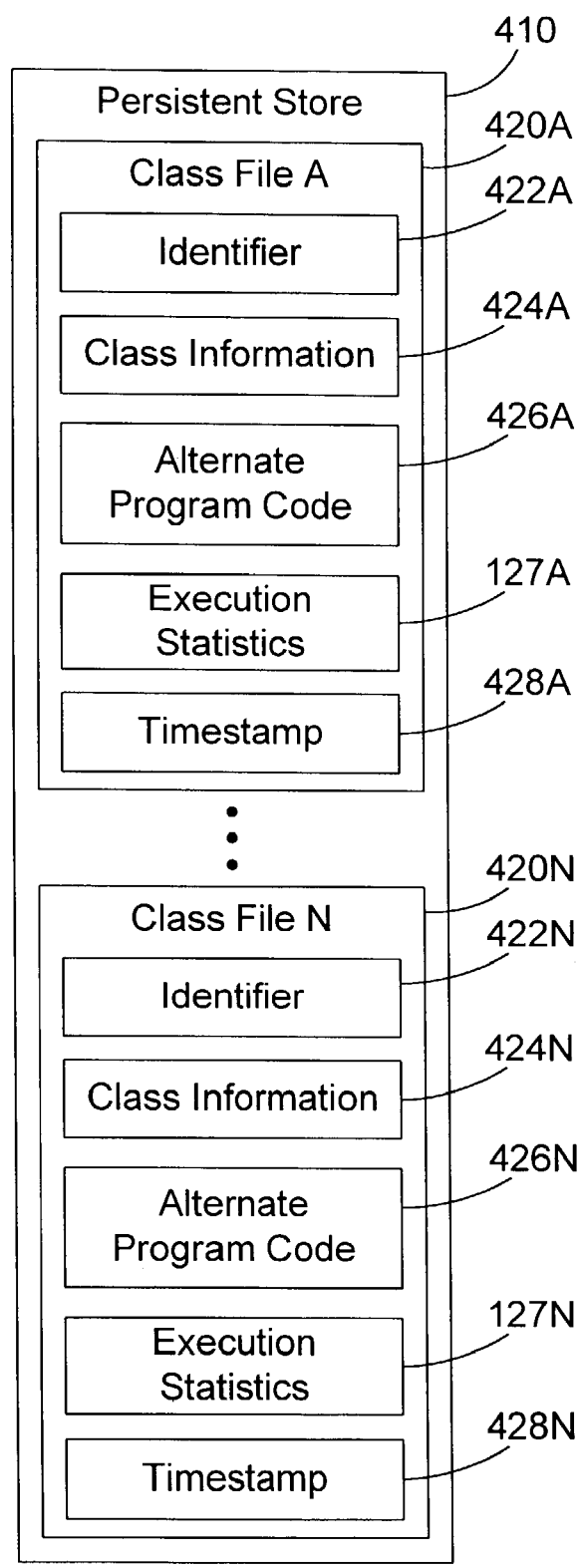
FIG. 4 is a block diagram of one specific way to store the persistent execution statistics in accordance with the preferred embodiments.

One example of an implementation in accordance with the preferred embodiments that uses a class file attachment to store the persistent execution statistics is shown in FIG. 4. We assume that class files (e.g., 420A . . . 420N in FIG. 4) are stored in a persistent store 410. For the specific example shown in FIG. 4, class file A 420A includes an identifier 422A, class information 424A, alternate program code 426A, execution statistics 127A, and a timestamp 428A. Identifier 422A uniquely identifies a class from all other classes. Class information 424A is the information that is used to process the class, such as Java bytecodes representative of a Java class. Alternate program code 426A is code that is generated as taught in the related applications, such as compiled code for one or more portions of the class file. Execution statistics 127A represent the portion of the persistent execution statistics 127 in FIG. 1 that pertain to class A 420A.

One or more other classes may reside in the persistent store, and will contain similar features as Class A, as shown by Class N in FIG. 4 with its associated identifier 422N, class information 424N, alternate program code 426N, execution statistics 127N, and timestamp 428N. Because class files are normally persistent, attaching execution statistics that correspond to portions of the class file to the class file itself is an effective and simple way to make the execution statistics persistent, and therefore available for subsequent executions of the class.

The preferred embodiments expressly include any and all mechanisms and methods for storing execution statistics in a persistent manner so the execution statistics may be made available to subsequent executions of a computer program. Note, however, that storing the execution statistics as an attribute to the class file, as discussed above, greatly simplifies the implementation of the preferred embodiments because execution statistics that relate to a particular class are stored as part of the class file. Of course, an alternative implementation within the scope of the preferred embodiments could build a persistent database of class names with their corresponding execution statistics that is independent from any class file. One specific implementation could use the cache in the related application, Ser. No. 10/193,581, filed on Jul. 11, 2002 to store the execution statistics for a class.

Because classes can be changed without changing the name of the class, execution statistics for a class may be unreliable if the class has been changed (i.e., edited and recompiled). Depending on the form of optimization performed, this could merely result in ineffective optimizations, or it could cause errors of one sort or another. The related application, Ser. No. 10/193,581, filed on Jul. 11, 2002, discloses performing a hash on the actual bytes of a class to generate an identifier (e.g., 422A . . . 422N in FIG. 4). In this manner, any change to the class will be detected, and the execution statistics for the class can be invalidated or discarded due to the change in the class.

The preferred embodiments enhance the functionality of a dynamic compiler by making execution statistics from previous executions of a computer program available so the dynamic compiler may make intelligent decisions about what to dynamically compile, when to compile it, and in what manner based on execution statistics gathered in previous executions, without having to wait until execution statistics have been gathered for the current execution. Note that the dynamic compiler of the preferred embodiments may perform any suitable function in interpreting, compiling, optimizing, or otherwise processing the computer program, whether the function is currently known or developed in the future.

The preferred embodiments described herein show the dynamic compilation logic 125 as residing within the dynamic compiler 123. This, however, is shown as one specific implementation within the scope of the preferred embodiments, which expressly cover the dynamic compilation logic 125 wherever it may reside. For example, in an alternative implementation within the scope of the preferred embodiments, the dynamic compilation logic may reside in a Java Virtual Machine (JVM), which then invokes a dynamic compiler when needed. The preferred embodiments and claimed invention expressly extend to any and all apparatus and methods that include dynamic compilation logic 125 that stores persistent execution statistics 127 and that uses the persistent executions statistics in determining what to compile, when to compile it, and how to compile it.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the dynamic compiler of the preferred embodiments may include the capability of flushing all previously-gathered execution statistics. This may be useful, for example, if the current execution is significantly different than previous executions, making the execution statistics from earlier executions not very useful in making decisions about performing dynamic compiling in the current execution. In the alternative, the dynamic compiler may ignore the persistent execution statistics in some cases and operate in a mode similar to that shown in the prior art method 200 of FIG. 2, only taking into account the execution statistics of the current execution. Again, this would be useful in a situation where the execution statistics from the earlier executions would not be very helpful in making decisions about dynamic compilation in the current execution. These and other variations are expressly within the scope of the preferred embodiments.

What is claimed is:

1. An apparatus comprising:
   at least one processor;
   a memory coupled to the at least one processor;
   a computer program residing in the memory; and
   dynamic compilation logic residing in the memory and executed by the at least one processor, the dynamic compilation logic executing part of the computer program before compilation of all portions of the computer program is complete, the dynamic compilation logic controlling the execution of the computer program and storing execution statistics for the computer program in a persistent store, the persistent store including execution statistics stored during at least one previous execution of the computer program, the dynamic compilation logic using the execution statistics in the persistent store to determine which portions of the computer program to dynamically compile as the computer program executes.

2. The apparatus of claim 1 wherein the dynamic compilation logic further determines from the execution statistics when to dynamically compile portions of the computer program.

3. The apparatus of claim 1 wherein the dynamic compilation logic further determines from the execution statistics how to dynamically compile and optimize portions of the computer program.

4. The apparatus of claim 1 wherein the execution statistics comprise a count of each time at least one method in the computer program is called.

5. The apparatus of claim 1 wherein the execution statistics comprise a count of the number of times each path is taken at a branch in the computer program.

6. The apparatus of claim 1 wherein the dynamic compilation logic staffs execution of the computer program in interpreted mode and dynamically compiles at least one portion of the computer program using the execution statistics.

7. The apparatus of claim 1 wherein the dynamic compilation logic uses the execution statistics to perform dynamic compilation of at least one portion of the computer program in a background process.

8. The apparatus of claim 1 wherein the persistent store comprises an attachment to a class file for an object oriented class in the computer program.

9. An apparatus comprising:
   at least one processor;
   a memory coupled to the at least one processor;
   a computer program residing in the memory;
   a persistent store coupled to the at least one processor;
   execution statistics residing in the persistent store, the execution statistics comprising a count of each time at least one method in the computer program is called and a count of the number of times each path is taken at a branch in the computer program during at least one previous execution of the computer program; and
   dynamic compilation logic residing in the memory and executed by the at least one processor, the dynamic compilation logic executing part of the computer program before compilation of all portions of the computer program is complete, the dynamic compilation logic controlling the execution of the computer program and storing execution statistics for the current execution of the computer program in the persistent store, the dynamic compilation logic using the execution statistics in the persistent store to determine which portions of the computer program to dynamically compile as the computer program executes, when to dynamically compile portions of the computer program, and how to dynamically compile and optimize portions of the computer program.

10. The apparatus of claim 9 wherein the dynamic compilation logic starts execution of the computer program in interpreted mode and dynamically compiles at least one portion of the computer program using the execution statistics.

11. The apparatus of claim 9 wherein the dynamic compilation logic uses the execution statistics to perform dynamic compilation of at least one portion of the computer program in a background process.

12. The apparatus of claim 9 wherein the persistent store comprises an attachment to a class file for an object oriented class in the computer program.

13. A computer-implemented method for executing a computer program, the method comprising the steps of:
    (A) beginning execution of the computer program before compilation of all portions of the computer program is complete;
    (B) reading execution statistics for at least one previous execution of the computer program from a persistent store; and
    (C) dynamically compiling at least one portion of the computer program using the execution statistics.

14. The method of claim 13 wherein step (A) begins execution of the computer program in interpreted mode.

15. The method of claim 13 further comprising the steps of:
    (D) storing execution statistics relating to the current execution of the computer program in the persistent store; and
    (E) determining which portions of the computer program to dynamically compile based on the execution statistics in the persistent store.

16. The method of claim 13 further comprising the step of determining from the execution statistics when to dynamically compile portions of the computer program.

17. The method of claim 13 further comprising the step of determining from the execution statistics how to dynamically compile and optimize portions of the computer program.

18. The method of claim 13 wherein step (C) comprises the step of dynamically compiling at least one portion of the computer program in a background process.

19. The method of claim 13 wherein the execution statistics comprise a count of each time at least one method in the computer program is called.

20. The method of claim 13 wherein the execution statistics comprise a count of the number of times each path is taken at a branch in the computer program.

21. The method of claim 13 wherein the persistent store comprises an attachment to a class file for an object oriented class in the computer program.

22. A computer-implemented method for executing a computer program, the method comprising the steps of:
    A be inning execution of the computer program before compilation of all portions of the computer program is complete;
    (B) reading execution statistics for at least one previous execution of the computer program from a persistent store;
    (C) storing execution statistics relating to the current execution of the computer program in the persistent store;

(D) determining from the execution statistics which portions of the computer program to dynamically compile;
(E) determining from the execution statistics when to dynamically compile portions of the computer program;
(F) determining from the execution statistics how to dynamically compile and optimize portions of the computer program; and
(G) dynamically compiling at least one portion of the computer program.

23. The method of claim 22 wherein step (A) begins execution of the computer program in interpreted mode.

24. The method of claim 22 wherein step (G) comprises the step of dynamically compiling at least one portion of the computer program in a background process.

25. The method of claim 22 wherein the execution statistics comprise a count of each time at least one method in the computer program is called.

26. The method of claim 22 wherein the execution statistics comprise a count of the number of times each path is taken at a branch in the computer program.

27. The method of claim 22 wherein the persistent store comprises an attachment to a class file for an object oriented class in the computer program.

28. A computer-readable program product comprising:
(A) dynamic compilation logic that executes part of a computer program before compilation of all portions of the computer program is complete and that controls execution of the computer program and stores execution statistics for the computer program in a persistent store, the persistent store including execution statistics stored during at least one previous execution of the computer program, the dynamic compilation logic using the execution statistics in the persistent store to determine which portions of the computer program to dynamically compile as the computer program executes; and
(B) recordable media bearing the dynamic compilation logic.

29. The program product of claim 28 wherein the dynamic compilation logic further determines from the execution statistics when to dynamically compile portions of the computer program.

30. The program product of claim 28 wherein the dynamic compilation logic further determines from the execution statistics how to dynamically compile and optimize portions of the computer program.

31. The program product of claim 28 wherein the execution statistics comprise a count of each time at least one method in the computer program is called.

32. The program product of claim 28 wherein the execution statistics comprise a count of the number of times each path is taken at a branch in the computer program.

33. The program product of claim 28 wherein the dynamic compilation logic staffs execution of the computer program in interpreted mode and dynamically compiles at least one portion of the computer program using the execution statistics.

34. The program product of claim 28 wherein the dynamic compilation logic uses the execution statistics to perform dynamic compilation of at least one portion of the computer program in a background process.

35. The program product of claim 28 wherein the persistent store comprises an attachment to a class file for an object oriented class in the computer program.

36. A program product comprising:
dynamic compilation logic that executes part of a computer program before compilation of all portions of the computer program is complete, that controls execution of the computer program and that stores execution statistics for the current execution of the computer program in the persistent store, the persistent store including execution statistics comprising a count of each time at least one method in the computer program is called and a count of the number of times each path is taken at a branch in the computer program during at least one previous execution of the computer program, the dynamic compilation logic using the execution statistics in the persistent store to determine which portions of the computer program to dynamically compile as the computer program executes, when to dynamically compile portions of the computer program, and how to dynamically compile and optimize portions of the computer program; and
(B) recordable media bearing the dynamic compilation logic.

37. The program product of claim 36 wherein the dynamic compilation logic staffs execution of the computer program in interpreted mode and dynamically compiles at least one portion of the computer program using the execution statistics.

38. The program product of claim 36 wherein the dynamic compilation logic uses the execution statistics to perform dynamic compilation of at least one portion of the computer program in a background process.

39. The program product of claim 36 wherein the persistent store comprises an attachment to a class file for an object oriented class in the computer program.

* * * * *